June 7, 1960 B. GOODMAN 2,939,240
MULTIPLE FISH CATCHER
Filed June 26, 1959
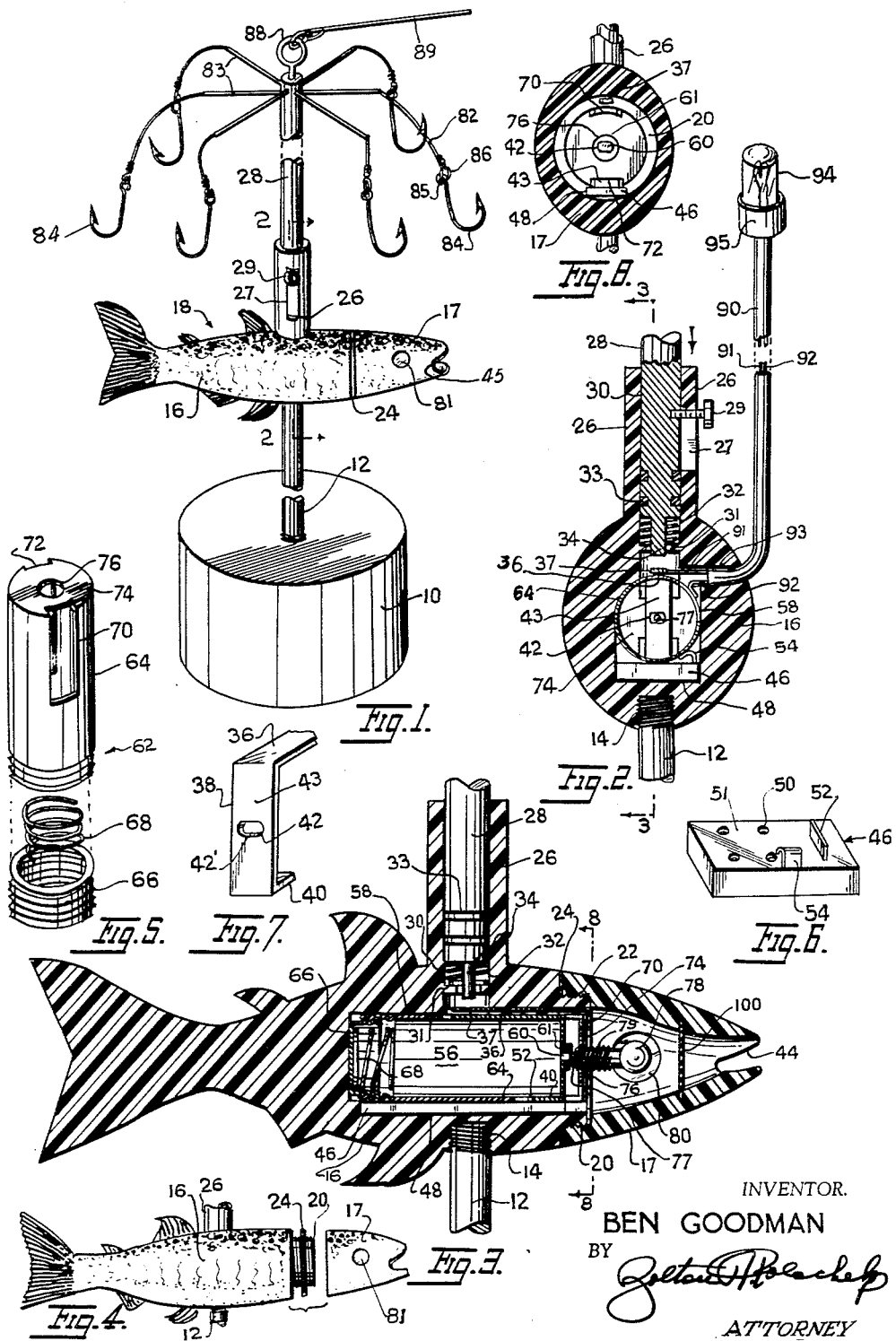
INVENTOR.
BEN GOODMAN
BY
ATTORNEY

United States Patent Office 2,939,240
Patented June 7, 1960

2,939,240

MULTIPLE FISH CATCHER

Ben Goodman, 309 W. 54th St., New York, N.Y.

Filed June 26, 1959, Ser. No. 823,219

6 Claims. (Cl. 43—17)

This invention relates to the art of fishing tackle and particularly concerns a fishing apparatus including visual and audible means for luring fish and multiple fish hooks.

According to the invention, there is provided a fishing apparatus which can be reeled over the side of a boat into a body of fresh or salt water. The apparatus is provided with a sinker for holding the device on the bottom of the body of water. Signal means are provided in the apparatus for emitting audible and visual signals adapted to attract the fish. The apparatus carries a plurality of spaced hooks. Additional signal means are provided for indicating to the fisherman when a fish has been caught upon one of the hooks.

It is therefore a principal object of the invention to provide a fish luring apparatus provided with audible and visual signal means attractive to fish.

It is a further object to provide a fish luring apparatus provided with a simulated fish body lure elevated upon a support, said lure carrying another support to which a plurality of fishing hooks are attached.

It is a still further object to provide a fishing apparatus of the character described wherein the fish body lure contains a battery, a signal light, and a sound device, the body of the lure being formed with a tapered horn-like sound outlet.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a fishing apparatus embodying the invention, parts being broken away.

Fig. 2 is a vertical sectional view on an enlarged scale taken on line 2—2 of Fig. 1, parts being broken away.

Fig. 3 is a sectional view taken on line 3—3 of Fig. 2.

Fig. 4 is an exploded elevational view of the fish body lure.

Fig. 5 is an exploded perspective view of an electrical contact assembly employed in the apparatus.

Fig. 6 is a perspective view of a sound emitting member employed in the apparatus.

Fig. 7 is a perspective view of an electrical contact element employed in the apparatus.

Fig. 8 is a vertical sectional view taken on line 8—8 of Fig. 3.

Referring to the drawings, in Fig. 1 there is shown a cylindrical solid base member 10 preferably formed of lead or iron to provide a heavy sinker for the apparatus. Secured in the sinker 10 is a non-corrosive metal post 12 which extends axially upward from the sinker. The upper end of post 12 is threaded in a bottom or ventral recess 14 of one section 16 of the fish body 18, constituting a lure. This body is shaped to simulate the body of a fish. It includes two hollow plastic sections, the body section 16 and a head section 17, as clearly shown in Fig. 4, which sections are detachably secured to each other. Section 16 has an outwardly extending threaded nipple 20 which fits into a mating threaded recess 22 in section 17. An oval ring gasket 24 with a circular hole fits between the sections on nipple 20 to provide a moisture-proof seal.

The dorsal or upper side of body section 16 is formed with a cylindrical boss or sleeve 26 in which is slidably fitted a non-corrosive metal post 28. The boss has an elongated slot 27 in its side wall through which extends the shank of a setscrew 29 to retain the post 28 in the boss. The boss has a central bore 30 formed with a shoulder 31 on which a coil spring 32 is seated. Rubber O-rings 33 secured in annular grooves in post 28 prevent water from entering the fish body lure 18 via sleeve 26. The post 28 terminates at its lower end in a pin extension 34 of reduced diameter. This pin extension has its free end normally slightly spaced from a leaf spring electrical contact 37 spaced slightly from an arm 36 of a generally U-shaped metal electrical contact element 38. Contact 37 is inserted in section 16 of fish body lure 18 as shown in Figs. 2, 3 and 8 and projects into the lower end of bore 30.

The arms of the electrical contact 38, as best shown in Fig. 7, are of varying lengths, the arm 36 being longer than the arm 40. An aperture 42 with flattened or straight opposite edges 42' is centrally disposed in the bight portion 43 of the contact element 38.

The mouth 44 of the fish body lure 18 has flared lateral cut-outs 45 in head section 17 to provide an efficient horn-like outlet for the sound waves of a flat sound emitting device 46 mounted in a shallow cavity 48 in body section 16. This sounder 46 is a conventional electrical horn, vibrator or the like which emits sound from the apertures 50 in the rectangular case 51 of the sounder as best shown in Fig. 6. The sounder is provided with two electrical input terminals or contacts 52 and 54 to which electrical voltage may be applied from a cylindrical electrical storage battery 56 shown in Fig. 3 but omitted from Fig. 2 in order to show internal parts. The battery is a dry cell type removably mounted in a cylindrical cavity 58 in body section 16.

Electrical contact element 38 fits over positive terminal 60 and adjacent end of the battery. An insulator 61 is placed over terminal 60 on element 38. This terminal 60 is flattened on its sides so that it fits snugly in aperture 42. The flattened walls of the battery terminal 60 prevent rotation of the contact element 38 on the battery. Arms 36 and 40 of the contact element abut opposite the sides of the battery as best shown in Fig. 3.

The battery is removably encased in a contact assembly 62 best shown in Fig. 5. This includes a metal tubular casing 64 open at one end and a mating screw cap 66 for the open end. A pressure spring 68 is removably seated in the cap. The casing has two opposed longitudinal slots 70, 72 extending from the closed end 74. A threaded aperture 76 is provided in the center of the closed end of the casing. A lamp bulb 78 having a threaded base 79 is threaded in aperture 76 as shown in Fig. 3. The lamp bulb is omitted from Fig. 8. The central contact tip 77 of the lamp bulb presses against terminal 60 of the battery. Adjacent lamp bulb 78 there are two circular windows 80 and 81 in opposite sides of head section 17 simulating fish eyes. These windows are preferably made of transparent green glass or plastic material so that green light is emitted from the fish body when lamp 78 is lit. Spring 68 contacts the metal bottom of the case of the battery which is the usual negative terminal of the battery. The battery is encased in the usual cardboard tube which insulates the metal case of the battery from the metal casing 64 in which the battery is housed. Terminal 52 of the sounder 46 contacts the shorter arm 40 of the contact element 38 as shown in Fig. 3 and spring contact element 37 contacts the casing 64 as clearly shown in Fig. 2.

The battery thus continuously energizes the lamp 78 since base 79 is seated in end 74 of casing 64 to which a negative voltage is applied via cap 66 and spring 68. Sounder 46 is continuously energized via element 52, arm 40 and battery terminal 60; and via terminal 54, casing 64, cap 66 and spring 68.

A thin rubber disc 100 is secured across the inner end of the mouth 44 of the fish body lure 18 to prevent water from entering the lure.

Post 28 supports a plurality of radially extending rigid arms 83, at the ends of which are secured wires 82. Hooks 84 have loops 85 which are engaged in rings 86 tied to the wires. An eye bolt 88 is screwed into the upper end of post 28. A fishing line 89 has one end tied to the eyebolt 88 and its other end is wound around a reel on a fishing pole whereby upon unwinding of the line the apparatus may be reeled over the side of the boat and upon winding the apparatus may be hauled up over the side of the boat.

In addition to the feel of the line, means is provided for visually indicating when a fish has been caught on one of the hooks 84. For this purpose, a cable 90 is provided, one end of which is electrically connected to the battery 56 and the other end to a lamp 94. The cable 90 is sufficiently long to reach from the fish body lure 18 to the deck of the boat. The cable 90 comprises two conducting wires 91 and 92. One end of the conductor 91 is connected to the spring electrical contact 37 and one end of conductor 92 is connected to the casing 64. The other ends of the conductors 91 and 92 are connected to terminals in a lamp socket 95 fastened to the end of the cable for supporting the lamp 94.

In use, with the head section 17 removed, the horn device 46, casing 64, battery 56 and lamp 78 are installed whereby the lamp becomes illuminated and the horn device energized thereby emitting a sound. The head section is then secured in position. The apparatus is reeled over the side of the boat into the body of water. The green light from the eyes 80 and 81 and the sound from the horn device 46 serve as lures to attract fish. The sound is amplified or modified by the mouth 44 of the fish body lure 18 to provide a low frequency sound which has been found generally attractive to fish. A green color light has been found the most effective one for attracting fish.

When a fish has been hooked, the feel of the line in the ordinary manner will indicate to the fisherman this fact. In addition, the pull on the line by the struggling fish will pull the post 28 downwardly whereby the pin 34 strikes the movable contact 37 and moves it into contact with the arm 36 of the contact 38 thereby closing the circuit through the lamp 94, and the up and down movements of the post caused by the struggle and spring 32 will cause the lamp to blink which indicates to the fisherman that a fish has been hooked.

There has thus been provided a fish luring apparatus which attracts fish by continuously emitting visual and audible signals attractive to fish and which provides a signal to the fisherman when a fish has been caught upon one of the hooks. The simulated fish body lure is also adapted to increase the realistic effect to attract fish.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A fishing apparatus including a post, a simulated fish body lure supported on said post intermediate its ends, a plurality of hooks flexibly connected to the post above the lure and an eye bolt on the upper end of the post for connecting the post to a fishing line, and means associated with the fish body lure for indicating that a fish has been hooked, said means including an electrical battery supported in the fish body lure and a lamp flexibly and electrically connected to the battery, the lamp being disposed remotely from the fish body lure.

2. A fishing apparatus comprising an upright post, a hollow simulated fish body lure supported at the top of said post, said body lure having windows simulating eyes, a weight at the bottom of said post, a second upright post supported by and extending upwardly from said fish body lure, a plurality of hooks flexibly mounted at the top of said second upright post, means at the top of said second upright post for connecting the post to a fish line, an electrical battery in said fish body lure, and a lamp in said fish body lure electrically connected to said battery and visible through the windows in the body lure.

3. A fishing apparatus comprising an upright post, a hollow simulated fish body lure supported at the top of said post, said body having an open mouth communicating with the hollow interior of the body, a weight at the bottom of said post, a second upright post supported by and extending upwardly of said fish body lure, a plurality of hooks flexibly mounted at the top of said second upright post, means at the top of said second upright post for connecting the post to a fish line, an electrical battery in said fish body lure, and an electrical horn device in said fish body lure electrically connected to said battery, for emitting sound waves through the mouth of said fish body lure.

4. A fishing apparatus comprising an upright post, a hollow simulated fish body lure supported at the top of said post, said body having windows simulating eyes and having an open mouth communicating with the hollow interior thereof, a weight at the bottom of said post, a second upright post supported by and extending upwardly from said fish body lure, a plurality of hooks flexibly mounted at the top of said second upright post, means at the top of said second upright post for connecting the post to a fish line, an electrical battery in said fish body lure, a lamp in said fish body lure electrically connected to said battery and visible through the windows in the body lure, and an electrical horn device in said fish body lure electrically connected to said battery for emitting sound waves through the mouth of said fish body lure.

5. A fishing apparatus comprising an upright post, a hollow simulated fish body lure supported at the top of said post, a weight at the bottom of said post, a second upright post slidably supported by and extending upwardly from said fish body lure, a plurality of hooks flexibly mounted at the top of said second upright post, means at the top of said second upright post for connecting the post to a fish line, an electrical battery in said fish body lure, a fixed electrical contact connected to said battery, a movable electrical contact disposed adjacent said fixed contact and disposed in the path of movement of said slidable second upright post, a lamp assembly supported by said fish body lure, including a pair of conductor wires, one of said wires having its end connected to said movable contact in the fish body lure, the other of said wires having its end connected to the battery, an electrical lamp socket electrically connected to the other ends of said conductors and an electrical lamp in said lamp socket, the arrangement of said fixed and movable switch contacts being such that downward movement of the slidable post moves said movable switch contact into contact with the fixed switch contact closing the circuit through the lamp, and spring means for automatically moving the slidable post upwardly.

6. A fishing apparatus comprising an upright post, a hollow simulated fish body lure supported at the top of said post, said body lure having windows simulating eyes, a weight at the bottom of said post, a second upright post supported by and extending upwardly from said fish body lure, a plurality of hooks flexibly mounted at the top of said second upright post, means at the top of said second upright post for connecting the post to a fish line, a hollow cylindrical metal casing closed at one end mounted in the hollow interior of said fish body lure, the closed end of said casing having a central opening, an electrical battery encased in said metal casing with its central terminal extending through and outwardly of the central opening in said casing, a metal cap on the open end of said casing, a spring interposed between the cap and end of the battery, and a lamp bulb in electrical connection with the protruding central terminal of the battery, said lamp bulb being visible through the windows in the fish body lure.

References Cited in the file of this patent

UNITED STATES PATENTS

| | | |
|---|---|---|
| 1,900,339 | Harrell | Mar. 7, 1933 |
| 2,184,073 | Fuiks | Dec. 19, 1939 |
| 2,754,610 | Carlson | July 17, 1956 |
| 2,757,475 | Pankove | Aug. 7, 1956 |